United States Patent
Yan

(10) Patent No.: US 12,460,307 B2
(45) Date of Patent: Nov. 4, 2025

(54) OFF-GRID ELECTROLYSIS CONTROL METHOD AND DEVICE THEREOF INDEPENDENT OF GRID

(71) Applicant: Micro Hydrogen Inc., Oakland, MD (US)

(72) Inventor: Qiang Yan, Halethorpe, MD (US)

(73) Assignee: Micro Hydrogen Inc., Oakland, MD (US)

( * ) Notice: Subject to any disclaimer, the term of this patent is extended or adjusted under 35 U.S.C. 154(b) by 589 days.

(21) Appl. No.: 17/959,296

(22) Filed: Oct. 3, 2022

(65) Prior Publication Data
US 2023/0043491 A1 Feb. 9, 2023

Related U.S. Application Data

(63) Continuation of application No. PCT/CN2021/000042, filed on Mar. 15, 2021.

(51) Int. Cl.
| | | |
|---|---|---|
| C25B 9/65 | (2021.01) | |
| C25B 1/04 | (2021.01) | |
| C25B 9/70 | (2021.01) | |
| C25B 15/02 | (2021.01) | |

(52) U.S. Cl.
CPC ............. C25B 9/65 (2021.01); C25B 1/04 (2013.01); C25B 9/70 (2021.01); C25B 15/02 (2013.01)

(58) Field of Classification Search
CPC .............. C25B 1/04; C25B 9/70; C25B 15/02
See application file for complete search history.

(56) References Cited

U.S. PATENT DOCUMENTS

2011/0155583 A1* 6/2011 Li ........................... C25B 1/04
204/229.2
2019/0264340 A1* 8/2019 Mitsushima ............ C25B 15/08

FOREIGN PATENT DOCUMENTS

| CN | 206692742 U | 12/2017 |
| CN | 206692745 U | 12/2017 |
| CN | 208395285 U | 1/2019 |

* cited by examiner

*Primary Examiner* — Alexander W Keeling
(74) *Attorney, Agent, or Firm* — Mei & Mark LLP; Manni Li

(57) ABSTRACT

A device and method of controlling an electrode and electrolytic cell are provided, which independently utilizes clean energy with large power fluctuation range as an electrolysis power source for hydrogen and oxygen production. The basic number of electrodes is set by the minimum cut-in voltage value of fluctuating power sources such as wind or solar power. According to fluctuating power sources such as wind or solar power, the ratio of the minimum cut-in current and the reference current corresponding to the lowest cut-in voltage value sets the effective size of the electrodes to be connected in or cut out.

15 Claims, 2 Drawing Sheets

OFF-GRID ELECTROLYSIS CONTROL METHOD AND DEVICE THEREOF INDEPENDENT OF GRID

CROSS-REFERENCE TO RELATED APPLICATIONS

The subject application is a continuation of PCT/CN2021/000042 filed on Mar. 15, 2021, which claims priority on Chinese Application No. CN202010287807.3 filed on Apr. 13, 2020 in China. The contents and subject matter of the PCT international application and the Chinese priority application are incorporated herein by reference.

TECHNICAL FIELD

The present invention relates to electrolysis techniques in the electrochemical field.

BACKGROUND OF THE INVENTION

Hydrogen and oxygen are both important industrial raw materials. But the hydrogen is a completely clean energy source, and it has the characteristics of high fuel value In addition to the reforming, decomposition, and photolysis of fossil fuels, the existing hydrogen production methods include water electrolysis for hydrogen production. So far, water electrolysis hydrogen production accounts for around 4% to 5% of the world's hydrogen production and more than 95% hydrogen is obtained through the reforming of fossil fuels, and the production process will inevitably emit $CO_2$. The water electrolysis technology independently utilizes clean energy that can achieve zero $CO_2$ emissions. Hydrogen production by water electrolysis is to dissociate water molecules into hydrogen and oxygen through an electrochemical process under the action of stable direct current, which are separated out at the cathode and anode respectively. According to the different diaphragms, it can be divided into alkaline water electrolysis, proton exchange membrane water electrolysis, and solid oxide water electrolysis. However, since water electrolysis to produce hydrogen requires a large amount of electricity with stable power (voltage, current), grid power has been used as the energy source for hydrogen production.

Using fixed power supply water hydrogen production technology, several groups of electrode plates are arranged in parallel and upright in the electrolyzer, the electrolyzer is divided into several electrolytic chambers connected in series, the number of series electrodes is set according to the DC voltage value of the power supply, and then according to the power set the size of the electrolyzer, the total voltage of the electrolyzer is the sum of the voltages of each electrolytic chambers, and the total current is the same as that of each electrolytic chamber.

Although renewable energy (such as wind and solar energy) have been used for hydrogen and oxygen production in recent years, the stability of power supply is very high due to water electrolysis for hydrogen production and oxygen production, while wind and solar energy are both have the characteristics of large fluctuation, and not only the power fluctuation range is very large, but also the voltage fluctuation range is very large. The difference between minimum and maximum voltage of the source electrical energy could be as many as ten times larger. Therefore, the existing methods and technologies for hydrogen production by electrolysis of water using wind energy and solar energy still need to rely on the grid as the main power source, while wind energy or solar energy is considered to be the source electricity. As an auxiliary power source only, even in areas with better wind resources, such as areas where annual power generation reaches 1,500 hours, the availability of wind energy is around 17.1%, and the annual available sufficient sunlight is around 1,500 hours. Basically, most of the nominal hydrogen production and oxygen production schemes using new energy still rely on the grid as the main power source, which limits the way to use clean energy to produce hydrogen.

Chinese Patent Application No. 201720255416.7 outlines a single electrolyzer and multiple electrodes in parallel, and controls the number of parallel electrodes connected by a contact switch to solve the power supply fluctuation of the electrolyzer. However, the design does not consider the power characteristics of renewable energy such as wind energy and solar energy. The first reason for the change of wind and solar power is the change of voltage. Its output voltage changes rapidly, the current then changes rapidly accordingly when the wind speed or sunlight changes. The large-scale changes, the power tracking characteristics in the wind and solar energy industries are current (power) changes based on voltage changes, and different voltages correspond to different power outputs (current changes). The present invention adopts the method of automatically controlling the number of electrodes to be connected or cut out in parallel through a very large change from the input source power. The electrolytic cell can only carry a DC power supply of about 2 volts, which can only be used when the voltage fluctuation range is small (within the allowable range of the electrode voltage), and when the size of the electrolytic cell is fixed, the range of the electrolytic cell to adapt to current changes is also very limited, such as from 0.25-0.3 amp/$cm^2$, it is not suitable for renewable energy with very large power fluctuations, meanwhile the large change of the voltage and current from the source power will damage the electrolyzer. The electric power characteristics of both wind and solar energy vary with the environment they are set up in, and the changes between the high and low voltage could be as much as ten times, which is far greater than the electrode reference voltage of 2 volts (0.6-1.1). So does the current.

SUMMARY OF INVENTION

To resolve the above problems, the present invention is proposing the control method and design structure for the electrolysis, which uses a very large fluctuation range of energy as a power source, such as wind or solar energy, so it is truly independent of the grid power, while the craft of the electrolysis is the same with traditional electrolysis.

In order to achieve the designing object, the present invention adopts the following technical solutions:

Under current technology, the conventional design of the existing electrolytic cell is that the size of the electrolytic cell is based on the current of 0.25 amp/$cm^2$ to 0.3 amp/$cm^2$. Within this current range, the performance is the best. Referred to as the reference current in the present invention, that is, the preferred reference current (Ib) is between 0.25 amp/$cm^2$ to 0.3 amp/$cm^2$, 0.3 amps per $cm^2$ is referred to as the maximum reference current in the present invention, and each electrical level is 2 volts Based on the DC voltage (the allowable variation range is 0.6-1.1 times of 2 volts), in the present invention, this voltage is called the reference voltage of the electrode.

Using renewable energy as a power source, such as wind and solar energy, the electrical power from the source varies due to the environment they are in. Usually, the voltage at the minimum available power is called the cut-in voltage, and the corresponding current is called the cut-in current (Ii). The core of the present invention is setting a certain number of basic series electrodes through the lowest cut-in voltage value of wind or solar energy at first, then setting the size of the electrode according to the ratio of the minimum cut-in current value corresponding to the minimum cut-in voltage value of wind or solar energy to the reference current value. When the power of wind or solar energy increases, the voltage of the power increases and the current of the power also increases. When the voltage increases, a certain number of electrodes will be connected in series to maintain the reference voltage of about 2 volts per electrode. On the contrary, when the voltage decreases, a certain number of series electrodes will be cut out; At the maximum reference current of the cell, an electrolyzer with the same number of electrodes in series (called parallel electrolyzer) will be connected in parallel to achieve the use of renewable energy water electrolysis (hydrogen production, Oxygen production) purpose.

FIG. 1. is a schematic diagram of the arrangement structure of the electrolyzer. The electrodes of the electrolyzer are composed of basic electrodes and a different number of series electrodes. The series electrodes are arranged on one or both sides of the basic electrodes. The electrolyzer is composed of several electrolysis chambers. The basic composition of each electrolysis chamber is the same as that of the conventional electrolysis chamber. It consists of positive and negative electrodes. Different types of diaphragms can be used in the middle of the electrodes. The DC output power of wind or solar energy is used as the total power supply of the electrolyzer.

In FIG. 1, the double contacts switch (or single-contact switch) is controlled by a controller composed of PLC or other control chips. The controller connects or cuts out a certain number of series electrodes according to the changing rule of the power supply voltage. When the power supply is initially connected, the electrode voltage has not risen high enough, the switch is at the a1/b1 position, the power supply is connected to the initial number of electrode, and the series electrodes are not connected at this time. When the voltage continues to rise, the reference voltage of each electrode reaches a higher level value (such as DC 2.2 volts), the switch is automatically connected to the a2/b2 position through the controller, the additional series electrodes will be connected, and the reference voltage of each electrode will drop; the same, when the controller detects that the reference voltage is lower than a certain level of value (for example, it is set to 1.6 volts), the connected series electrodes will be cut out of several groups, to maintain the reference voltage of each electrode at a designed voltage state, such as between 1.6-2.2 volts. The newly cutting in or cutting out series electrodes can be connected in several groups or in one by one according to the power changing value. When the power continues to increase and the electrodes connected in series can no longer consume the continuously increasing input power, the current of the electrodes will reach or exceed the maximum reference current Imax (such as 0.3 amps or 0.35 amps), then connect one or more in parallel electrolyzers with the same number of electrodes in series as the basic electrolyzer is referred to in the present invention as parallel electrolyzer; also as the power continues to decrease, the current in the electrolyzer is reduced to less than the setting reference current (such as 0.2 amp/cm$^2$ or 0.1 amp/cm$^2$), the electrolyzers connected in parallel will be automatically cut out one by one. That is, the voltage increases or decreases, the number of electrodes is connected in series or cut out first, and the current increases or decreases by connecting or cutting out the parallel electrolytic cell. When the negative electrode of the electrode is the common terminal, the negative electrode may not be set to be always in the ON state. The following will specifically illustrate how the series electrodes and the parallel electrolytic cells are connected or cut out through different embodiments.

The present invention provides a device for electrolysis comprising a power supply for supplying power to electrolysis, wherein the power supply is a fluctuating power supply with a power fluctuation in a range from a minimum power to a maximum power, and the maximum power is greater than 2 times of the minimum power, and in a range from a minimum cut-in current to a maximum current, and the maximum current is greater than 3 times of the minimum cut-in current.

In the present invention, the device may further comprise an electrolyzer system, wherein the electrolyzer system comprises a basic electrolyzer comprising a plurality of groups of basic electrodes connected in series with each other and a plurality of groups of controllable series electrodes, and a plurality of controllable parallel electrolyzers, wherein a number of the basic electrodes in the basic electrolyzer is set according to a minimum cut-in voltage value of the fluctuating power supply.

In the present invention, the reference voltage of each of the basic electrodes and the controllable series electrodes may be set to be between 1 to 2 Vdc.

In the present invention, the parallel electrolyzer may comprise the same number of the plurality of groups of basic electrodes connected in series with each other and the same number of the plurality of groups of controllable series electrodes as in the basic electrolyzer.

In the present invention, the size of the electrolyzer may be set according to the ratio of Ii/Ib, Ii is the minimum cut-in current corresponding to the minimum cut-in voltage of the fluctuating power supply, Ib is a reference current corresponding to the reference voltage, and the ratio Ii/Ib may be in a range of from 0.003 to 10.

In the present invention, the reference current Ib may be in a range of from 0.01 to 0.35 amp per square centimeter.

In the present invention, the number of the controllable parallel electrolyzers in the device may be 0 to 5, and the controllable parallel electrolyzer may be connected or cut out in parallel according to the power fluctuation.

In the present invention, the number of the controllable series electrodes may be connected or cut out in series according to the positive and negative voltage fluctuation of 20% or more, respectively.

In the present invention, the device may further comprise a controller, wherein the controller detects voltage, current, and the fluctuating power, connects with and controls that controllable series electrodes being connected in cutting in or cutting out in series and the controllable parallel electrolyzers being connected in cutting in or cutting out in parallel, and the controller comprises a negative terminal and a positive terminal, the negative terminal is a control terminal of the controller, and the positive terminal is a common terminal.

Further, the present invention provides a method for supplying and maintaining power supply for electrolysis, comprising providing a power supply for supplying power to electrolysis, wherein the power supply is a fluctuating power supply with a power fluctuation in a range from a minimum power to a maximum power, and the maximum power is greater than 2 times of the minimum power, and in a range from a minimum cut-in current to a maximum current, and the maximum current is greater than 3 times of the minimum cut-in current; providing an electrolyzer system, wherein the electrolyzer system comprises a basic electrolyzer comprising a plurality of groups of basic electrodes connected in series with each other and a plurality of groups of controllable series electrodes, and a plurality of controllable parallel electrolyzers; setting a number of the basic electrodes in the basic electrolyzer according to a minimum cut-in voltage value of the fluctuating power supply; setting a size of the basic electrolyzer and the controllable parallel electrolyzers according to a ratio of Ii/Ib, Ii is the minimum cut-in current corresponding to the minimum cut-in voltage of the fluctuating power supply, Ib is a reference current corresponding to the reference voltage, and the ratio Ii/Ib is in a range of from 0.003 to 10, and connecting in or cutting out the number of the controllable parallel electrolyzers in the device according to the power fluctuation.

In the method of the present invention, the reference voltage of each of the basic electrodes and the controllable series electrodes may be set to be between 1 to 2 Vdc.

In the method of the present invention, the parallel electrolyzer may comprise the same number of the plurality of groups of basic electrodes connected in series with each other and the same number of the plurality of groups of controllable series electrodes as in the basic electrolyzer.

In the method of the present invention, the reference current Ib may be in a range of from 0.01 to 0.35 amp/cm$^2$.

In the method of the present invention, the number of the controllable parallel electrolyzers in the device may be 0 to 5.

The method of the present invention may further comprise the steps of connecting in the controllable series electrodes according to a positive voltage fluctuation of 20% or more, and cutting out the controllable series electrodes according to a negative voltage fluctuation of 20% or more.

In the method of the present invention, the device may further comprise a controller, wherein the controller detects voltage, current, and the fluctuating power, connects with and controls that controllable series electrodes being connected in cutting in or cutting out in series and the controllable parallel electrolyzers being connected in cutting in or cutting out in parallel, and the controller comprises a negative terminal and a positive terminal, the negative terminal is the control terminal of the controller, and the positive terminal is the common terminal.

DETAILED DESCRIPTION OF THE INVENTION

Figure 1:
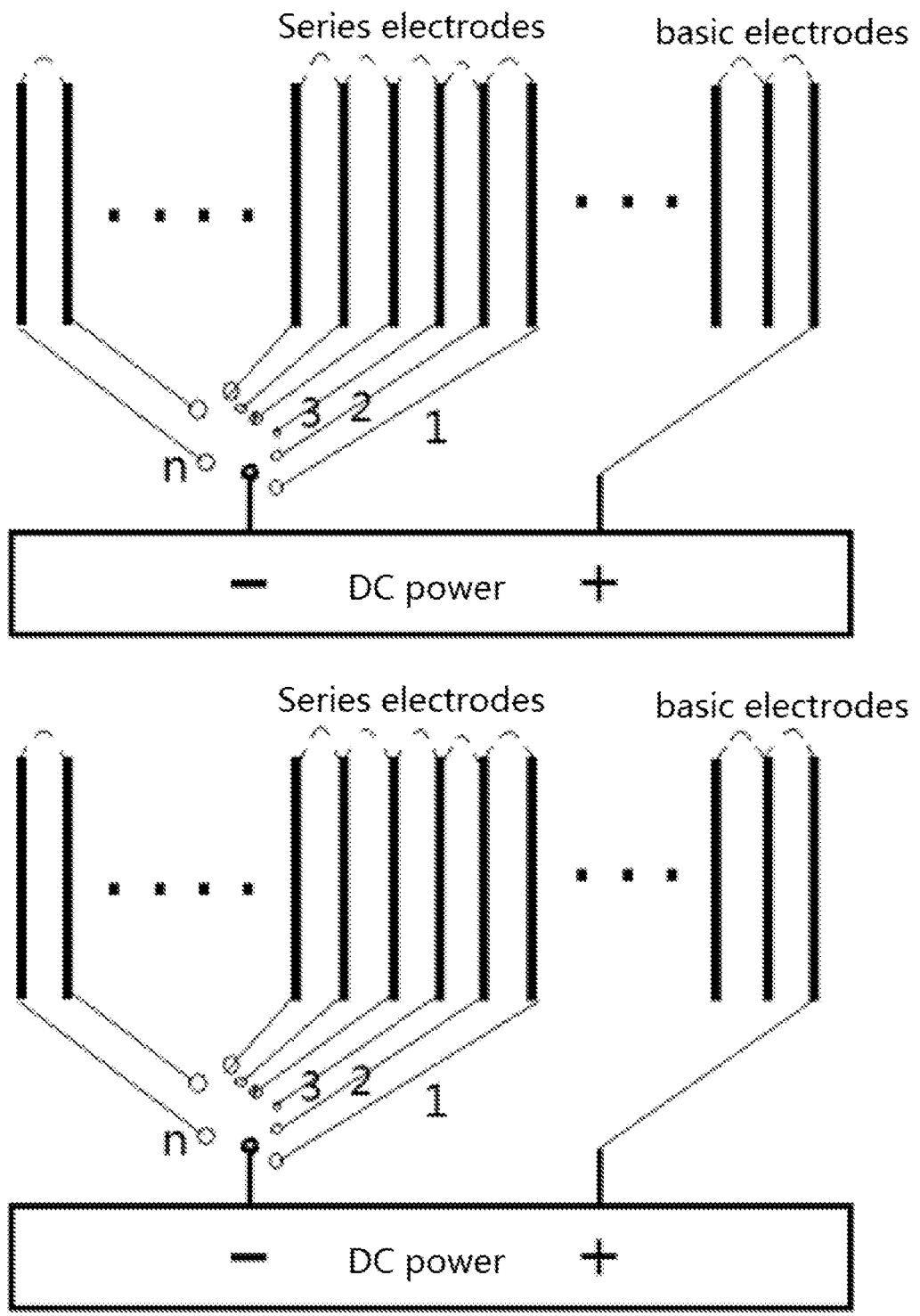
FIG. 1 shows the basic structure of the electrolyzer of the present invention.
Figure 2:
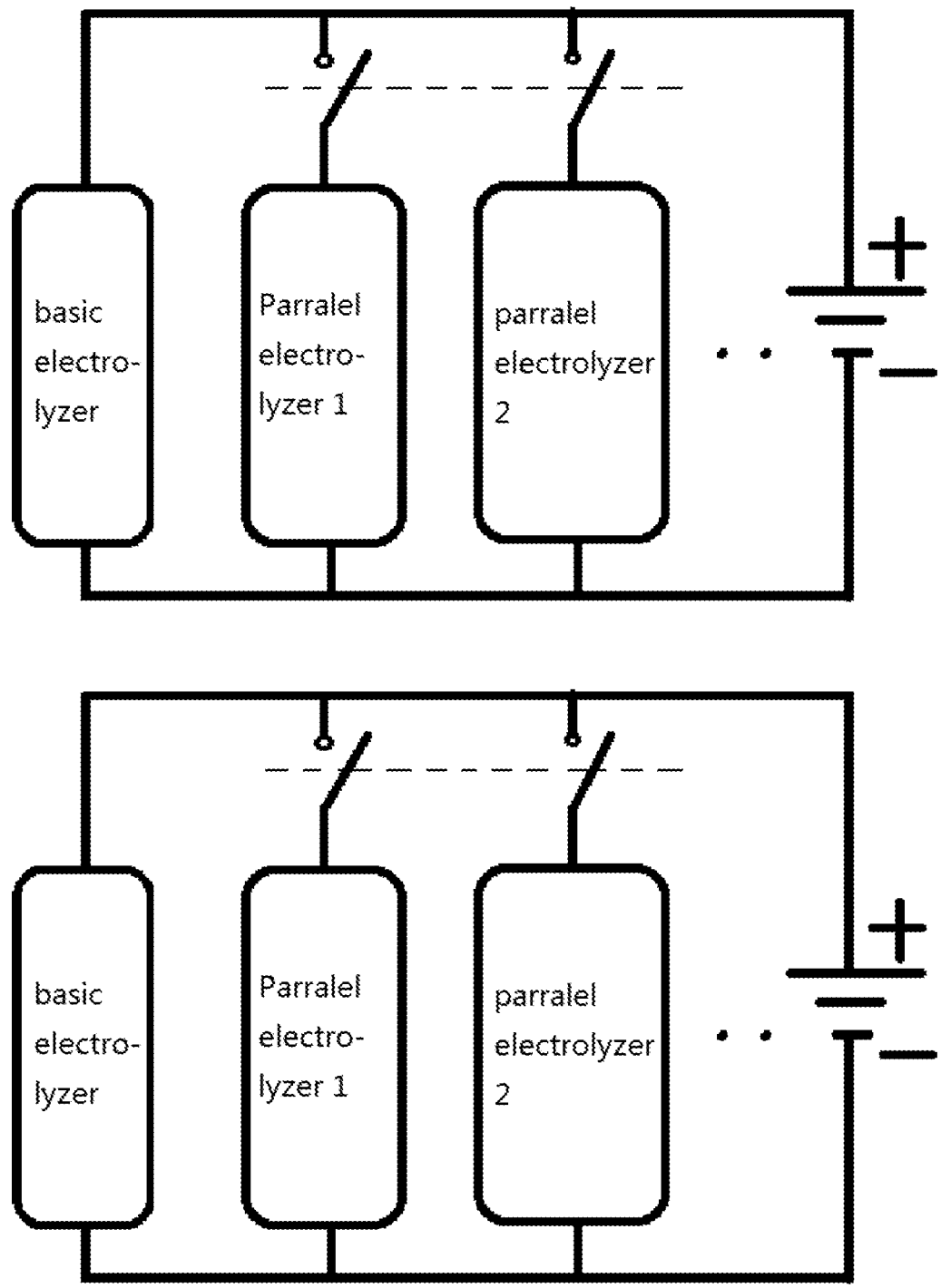
FIG. 2 shows the control method of the basic electrolytic cell and the parallel electrolytic cell in the present invention.

Due to the characteristics of renewable energy and customized power generation scales, the implementation of the present invention will be described in detail below with referenced examples. Defining the number of basic electrodes (electrolysis chambers) will be described in detail including the criteria of cutting-in and cutting-out of electrodes and electrolyzers. So do how to resize the electrode, and the approaches to the electrolyzers cutting in and out.

However, this should not limit the scope of protection of the present invention. It is understood that the professionals in the area can easily subdivide the number of electrodes and the number of electrolyzers in these embodiments without violating the scope of these claims. Changes and combinations, especially re-setting new reference current, reference voltage, or re-setting the minimum cut-in voltage, cut-in current, or re-setting the ratio of the minimum cut-in current and the reference current, so as to obtain a new specific implementation method, These new specific implementations obtained by changing the reference current, the reference voltage, the minimum cut-in voltage and the minimum cut-in current, the ratio setting of the minimum cut-in current and the reference current, the change of the number of electrodes, and the combination are also included in the protection scope of the present invention.

Example 1

Example 1 is a single generator using 0.25 amp as the reference current scheme. Select a wind turbine with a rated power 100 kw, the generator is a three-phase permanent magnet synchronous generator, the rated voltage of the generator is 110 Vac, the rated wind speed is 12 m/s, and the output of the generator is rectified and connected in parallel to the DC bus bar as the power supply for the electrolyzers. The following Table 1-1 shows the power output characteristics of a certain wind turbine at different wind speeds:

TABLE 1-1

| Wind (m/s) | Vac | Vdc | Idc | Watt |
|---|---|---|---|---|
| 12 | 110.0 | 146.3 | 683.5 | 100000 |
| 11.5 | 105.4 | 140.2 | 627.8 | 88014 |
| 11 | 100.8 | 134.1 | 574.4 | 77025 |
| 10.5 | 96.3 | 128.0 | 523.3 | 66992 |
| 10 | 91.7 | 121.9 | 474.7 | 57870 |
| 9.5 | 87.1 | 115.8 | 428.4 | 49617 |
| 9 | 82.5 | 109.7 | 384.5 | 42188 |
| 8.5 | 77.9 | 103.6 | 343.0 | 35540 |
| 8 | 73.3 | 97.5 | 303.8 | 29630 |
| 7.5 | 68.8 | 91.4 | 267.0 | 24414 |
| 7 | 64.2 | 85.3 | 232.6 | 19850 |
| 6.5 | 59.6 | 79.2 | 200.5 | 15893 |
| 6 | 55.0 | 73.2 | 170.9 | 12500 |
| 5.5 | 50.4 | 67.1 | 143.6 | 9628 |
| 5 | 45.8 | 61.0 | 118.7 | 7234 |
| 4.5 | 41.3 | 54.9 | 96.1 | 5273 |
| 4 | 36.7 | 48.8 | 75.9 | 3704 |

The basic reference current of the electrode of the electrolyzer in the example is set at 0.25 amp/cm$^2$, and the maximum reference current is 0.3 amp/cm$^2$, as shown in Table 1-2:

| Wind (m/s) | Vdc (V) | Idc (A) | Power (w) | Number of electrodes in series | size of electrode (cm$^2$) | available power (w) |
|---|---|---|---|---|---|---|
| 4 | 48.8 | 75.9 | 3706 | 26 | 304 | 3706 |
| 4.5 | 54.9 | 96.1 | 5277 | 29 | 304 | 5277 |
| 5 | 61 | 118.7 | 7239 | 32 | 304 | 7239 |

-continued

| | | | | | | |
|---|---|---|---|---|---|---|
| 5.5 | 67.1 | 143.6 | 9635 | 35 | 304 | 9635 |
| 6 | 73.2 | 170.9 | 12509 | 38 | 304 | 12509 |
| 6.5 | 79.2 | 200.5 | 15883 | 41 | 304 | 15883 |
| 7 | 85.3 | 232.6 | 19840 | 44 | 304 | 19840 |
| 7.5 | 91.4 | 267.0 | 24404 | 47 | 304 | 24404 |
| 8 | 97.5 | 303.8 | 29620 | 50 | 304 | 29620 |
| 8.5 | 104 | 343.0 | 35530 | 53 | 304 | 35530 |
| 9 | 110 | 384.5 | 42178 | 56 | 304 | 42178 |
| 9.5 | 116 | 428.4 | 49608 | 59 | 304 | 49608 |
| 10 | 122 | 474.7 | 57862 | 62 | 304 | 57862 |
| 10.5 | 128 | 523.3 | 66986 | 65 | 304 | 66986 |
| 11 | 134 | 574.4 | 77021 | 68 | 304 | 77021 |
| 11.5 | 140 | 627.8 | 88011 | 71 | 304 | 88011 |
| 12 | 146 | 683.5 | 100000 | 74 | 304 | 100000 |

| Wind (m/s) | Max. allowable power consumption of series electrodes (w) | Excess power of series electrolyzers (w) | size of parallel electrolyzer 1 (cm²) | allows power consumption of parallel electrolyzer 1 (w) | Power actually consumed by parallel electrolyzer 1 (w) | excess power of parallel electrolyzer 1 (w) |
|---|---|---|---|---|---|---|
| 4 | 4447 | −741 | | | | |
| 4.5 | 5007 | 270 | 384 | 6332 | 270 | −6062 |
| 5 | 5563 | 1676 | 384 | 7027 | 1676 | −5352 |
| 5.5 | 6120 | 3515 | 384 | 7730 | 3515 | −4215 |
| 6 | 6676 | 5833 | 384 | 8433 | 5833 | −2600 |
| 6.5 | 7223 | 8660 | 384 | 9124 | 8660 | −463 |
| 7 | 7779 | 12060 | 384 | 9827 | 12060 | 2234 |
| 7.5 | 8336 | 16068 | 384 | 10529 | 16068 | 5539 |
| 8 | 8892 | 20728 | 384 | 11232 | 20728 | 9496 |
| 8.5 | 9448 | 26081 | 384 | 11935 | 26081 | 14147 |
| 9 | 10005 | 32173 | 384 | 12637 | 32173 | 19536 |
| 9.5 | 10561 | 39047 | 384 | 13340 | 39047 | 25707 |
| 10 | 11117 | 46745 | 384 | 14043 | 46745 | 32702 |
| 10.5 | 11674 | 55312 | 384 | 14746 | 55312 | 40566 |
| 11 | 12230 | 64791 | 384 | 15448 | 64791 | 49342 |
| 11.5 | 12786 | 75225 | 384 | 16151 | 75225 | 59074 |
| 12 | 13343 | 86657 | 384 | 16854 | 86657 | 69804 |

The Following is connected to and continued from the above form:

| Size of parallel electrolyzer 2 (cm²) | Parallel electrolyzers 2 allow power consumption (w) | Actual power consumption of parallel electrolyzers 2 (w) | Parallel electrolyzer 2 surplus power (w) | Size of parallel electrolyzer 3 (cm²) | Parallel electrolyzers 3 allow power consumption (w) | Actual power consumption of parallel electrolyzers 3 (w) | Parallel electrolyzer 3 surplus power (w) |
|---|---|---|---|---|---|---|---|
| 930 | 23808 | 2234 | −21574 | | | | |
| 930 | 25501 | 5539 | −19962 | | | | |
| 930 | 27203 | 9496 | −17707 | | | | |
| 930 | 28904 | 14147 | −14758 | | | | |
| 930 | 30606 | 19536 | −11070 | | | | |
| 930 | 32308 | 25707 | −6602 | | | | |
| 930 | 34010 | 32702 | −1308 | | | | |
| 930 | 35712 | 40566 | 4854 | 2093 | 80383 | 4854 | −75528 |
| 930 | 37414 | 49342 | 11929 | 2903 | 116788 | 11929 | −104859 |
| 930 | 39116 | 59074 | 19958 | 2903 | 122100 | 19958 | −102142 |
| 930 | 40818 | 69804 | 28986 | 2903 | 127413 | 28986 | −98427 |

The steps to connect the cutting in/cutting out electrodes are as follows: According to the table above, when the wind speed is 4 m/s, the power of the 100 kw turbine is 3706 watts, the rectified DC voltage is 48.8 volts, and the DC current is 75.9 amp. When the reference voltage is defined at 2-volt level, 48.8 volts can accommodate 25-26 basic electrodes in series. By following the electrode voltage changing rate, in this embodiment, 26 strings are defined at 48.8-volt level, and then according to the reference current of the electrode per square centimeter is 0.25 amps, 75.9 amps requires 304 cm² electrode (75.9/0.25), so 304 cm² is the effective size for a basic electrode (electrolyzer).

When the wind speed increased to 4.5 m/s, the DC voltage increased to 54.9 volts, with the DC current increasing to 96.1 amps, the DC power also increased to 5277 watts, 54.9 volts required 29 series electrodes, when the DC voltage is 54.9 volts, the maximum power that the series electrodes can carry is 54.9 volts×304 (electrode size)×0.3 amps (maximum reference current)=5007 watts, but the power supply 5277 watts, which is 270 watt more than the electrolyzer at 29 series electrodes. So it requires a new electrolyzer in parallel connecting (called parallel electrolyzer) to consume the additional power of 270 watts. The electrolyzer connected in parallel must has the same number of electrodes and series electrodes as the basic electrolyzer to keep the voltage of each electrode consistent, but the size of the electrolyte can be the same as the basic electrode or it also can be reset according to the new ratio of Li/Lb. This embodiment sets the effective size of the parallel electrolyzer according to the new current.

At 54.9-volt level, the DC current is 96.1 amps, the electrode effective size of the parallel electrolyzer is 96.1/0.25=384 cm² (i.e, relative to the basic electrolyzer, the minimum cut-in current of the parallel electrolyzer is increased from 75.9 amps to 96.1 amps). The maximum power of an electrolyzer with 384 cm² can carry 6332 watts under the condition of 29-stage series electrodes, while the fluctuating power for the parallel electrolyzer is 270 watts (because the basic electrolyzer and the parallel electrolyzers are connected in parallel with each other, the voltage of electrolyzers are the same. The current is distributed according to the area of the electrolyzer, so the actual current of the electrolyzer is distributed in proportion to the size of the electrolyzer), so the parallel electrolyzer still has a surplus capacity of 6062 watts (in the following embodiments, the electrolyzer has a surplus capacity of 6062 watts. The calibration is a negative value. When the power is negative, there is no need to connect a new electrolyzer in parallel); when the wind speed increases to 6.5 m/s, the parallel electrolyzer still has a surplus capacity of 463 watts without requiring a new parallel electrolyzer; When the wind speed reaches 7 m/s, the voltage increases to 85.3 volts and the current increases to 232.6 amps. At this point, the output power of the turbine is greater than the basic electrolyzer and the parallel electrolyzer #1. The loadable power of 2234 watts requires a new electrolyzer #2 in parallel. The electrode size of parallel electrolyzer #2 is defined at 232.6 amps, and the size is 232.6/0.25=930.4 cm². Three electrolyzers in parallel with each other (basic electrolyzer, parallel electrolyzer #1 and parallel electrolyzer #2) are actually the power consumed that is 19,840 watts (power supply), and the three electrolyzers have a surplus capacity of 21,574 watts. When the output power of the wind turbine is greater than the power that the electrolyzer can carry, a new electrolyzer must be connected in parallel. However, the size of the electrolyzer can be the same as that of the basic electrolyzer, or it can be re-sized according to the current when the electrolyzers are connected in parallel.

Example 2

Example 2 is a single generator using 0.07 amp as the reference current scheme. Example 2 is a single generator using 0.07 amp as the reference current scheme. Example 2 uses the same wind turbine as Example 1, but the reference current is reduced to 0.07 amp/cm², and the maximum reference current is still 0.3 amp/cm², as shown in Table 2:

| Wind (m/s) | Vdc (V) | Idc (A) | Power (w) | quntity of series electrodes | size of electrode (cm²) | Available power for series electrodes (w) |
|---|---|---|---|---|---|---|
| 4 | 48.8 | 75.9 | 3706 | 26 | 1085 | 3706 |
| 4.5 | 54.9 | 96.1 | 5277 | 29 | 1085 | 5277 |
| 5 | 61 | 118.7 | 7239 | 32 | 1085 | 7239 |
| 5.5 | 67.1 | 143.6 | 9635 | 35 | 1085 | 9635 |
| 6 | 73.2 | 170.9 | 12509 | 38 | 1085 | 12509 |
| 6.5 | 79.2 | 200.5 | 15883 | 41 | 1085 | 15883 |
| 7 | 85.3 | 232.6 | 19840 | 44 | 1085 | 19840 |
| 7.5 | 91.4 | 267.0 | 24404 | 47 | 1085 | 24404 |
| 8 | 97.5 | 303.8 | 29620 | 50 | 1085 | 29620 |
| 8.5 | 103.6 | 343.0 | 35530 | 53 | 1085 | 35530 |
| 9 | 109.7 | 384.5 | 42178 | 56 | 1085 | 42178 |
| 9.5 | 115.8 | 428.4 | 49608 | 59 | 1085 | 49608 |
| 10 | 121.9 | 474.7 | 57862 | 62 | 1085 | 57862 |
| 10.5 | 128 | 523.3 | 66986 | 65 | 1085 | 66986 |
| 11 | 134.1 | 574.4 | 77021 | 68 | 1085 | 77021 |
| 11.5 | 140.2 | 627.8 | 88011 | 71 | 1085 | 88011 |
| 12 | 146.3 | 683.5 | 100000 | 74 | 1085 | 100000 |

| Wind (m/s) | Max allowable consumption power of series electrodes (w) | Surplus power of series electrolyzers (w) | quantity of parallel electrolyzers | Parallel electrolyzer 1 allows power consumption (w) | Power consumption of parallel electrolyzer 1 (w) | Surplus power of parallel electrolyzer 1 (w) |
|---|---|---|---|---|---|---|
| 4 | 17631 | −13925 | 0 | | | |
| 4.5 | 19836 | −14559 | 0 | | | |
| 5 | 22040 | −14801 | 0 | | | |
| 5.5 | 24244 | −14609 | 0 | | | |
| 6 | 26448 | −13939 | 0 | | | |
| 6.5 | 28615 | −12732 | 0 | | | |

-continued

| | | | |
|---|---|---|---|
| 7 | 30819 | −10979 | 0 |
| 7.5 | 33023 | −8619 | 0 |
| 8 | 35227 | −5608 | 0 |
| 8.5 | 37431 | −1902 | 0 |
| 9 | 39635 | 2543 | 1 | 39635 | 2543 | −37092 |
| 9.5 | 41839 | 7769 | 1 | 41839 | 7769 | −34071 |
| 10 | 44043 | 13819 | 1 | 44043 | 13819 | −30224 |
| 10.5 | 46247 | 20739 | 1 | 46247 | 20739 | −25508 |
| 11 | 48451 | 28570 | 1 | 48451 | 28570 | −19881 |
| 11.5 | 50655 | 37356 | 1 | 50655 | 37356 | −13299 |
| 12 | 52859 | 47141 | 1 | 52859 | 47141 | −5718 |

According to the same method as example 1, when the effective power of the wind turbine starts coming in, the DC voltage is 48.8 volts, the basic electrolyzer is provided with 26-stage series electrodes, and the reference current is reduced to 0.07 amps when the DC current is 75.9 amps, then the basic electrolyzer size is 75.9/0.07=1085 cm$^2$, no additional electrolyzer is needed if the wind speed is no higher than 9 m/s. When the wind speed is higher than 9 m/s, the output power of the wind turbine (power supply) is greater than the power that the electrolyzer can carry, and an additional electrolyzer is needed under the condition that the size of the additional electrolyzer is the same as that of the basic electrolyzer, the output power of the wind turbine can be met under the rated wind condition without adding a new electrolyzer.

Example 3

Example 3 is a single generator using 0.037 amp as the reference current scheme. Example 3 uses the same wind turbine as Example 1, but the reference current is reduced to 0.037 amp/cm$^2$, and the maximum reference current is set to 0.333 amp/cm$^2$, as shown in Table 3:

are set with 26 series in the basic electrolyzer, the DC current is 75.9 amps, the reference current is reduced to 0.037 amps, the maximum reference current is 0.333 amp/cm$^2$, and the effective size of the electrode is 75.95/0.037=2053 cm$^2$, a 2053 cm$^2$ electrolyzer with 146.3 volts and 683.5 amps at maximum power, it can carry 100,018 watts with the maximum allowable reference current increased to 0.333 amp/cm$^2$, greater than the maximum power of the fluctuating power supply, the basic electrolyzer can still meet the demand without additional parallel electrolyzer. However, due to the relatively low power at low wind speed, the hydrogen and oxygen production is very small, the equipment works under low load conditions, and the effective utilization rate of the equipment is at low end.

Example 4

In Example 4, two identical generators are connected in parallel as the power supply, and 0.1 amp is used as the reference current scheme. Example 4 uses two wind turbines that are the same as example 1, after rectification and output in parallel as the power supply for the electrolyzers. The reference current is defined at 0.1 amp/cm$^2$ and the maxi-

| Wind (m/s) | Vdc (V) | Idc (A) | power (w) | quantity of series electrodes | size of basic electrode (cm$^2$) | Available power for series electrodes (w) | Max allowable consumed power of series electrodes (w) | Surplus power of series electroyzers (w) | quantity of parallel electrolyzers |
|---|---|---|---|---|---|---|---|---|---|
| 4 | 48.8 | 75.9 | 3706 | 26 | 2053 | 3706 | 33356 | −29650 | 0 |
| 4.5 | 54.9 | 96.1 | 5277 | 29 | 2053 | 5277 | 37532 | −32255 | 0 |
| 5 | 61 | 118.7 | 7239 | 32 | 2053 | 7239 | 41703 | −34464 | 0 |
| 5.5 | 67.1 | 143.6 | 9635 | 35 | 2053 | 9635 | 45873 | −36238 | 0 |
| 6 | 73.2 | 170.9 | 12509 | 38 | 2053 | 12509 | 50043 | −37535 | 0 |
| 6.5 | 79.2 | 200.5 | 15883 | 41 | 2053 | 15883 | 54145 | −38262 | 0 |
| 7 | 85.3 | 232.6 | 19840 | 44 | 2053 | 19840 | 58315 | −38475 | 0 |
| 7.5 | 91.4 | 267.0 | 24404 | 47 | 2053 | 24404 | 62486 | −38081 | 0 |
| 8 | 97.5 | 303.8 | 29620 | 50 | 2053 | 29620 | 66656 | −37036 | 0 |
| 8.5 | 103.6 | 343.0 | 35530 | 53 | 2053 | 35530 | 70826 | −35296 | 0 |
| 9 | 109.7 | 384.5 | 42178 | 56 | 2053 | 42178 | 74996 | −32818 | 0 |
| 9.5 | 115.8 | 428.4 | 49608 | 59 | 2053 | 49608 | 79167 | −29559 | 0 |
| 10 | 121.9 | 474.7 | 57862 | 62 | 2053 | 57862 | 83337 | −25474 | 0 |
| 10.5 | 128 | 523.3 | 66986 | 65 | 2053 | 66986 | 87507 | −20521 | 0 |
| 11 | 134.1 | 574.4 | 77021 | 68 | 2053 | 77021 | 91677 | −14657 | 0 |
| 11.5 | 140.2 | 627.8 | 88011 | 71 | 2053 | 88011 | 95848 | −7837 | 0 |
| 12 | 146.3 | 683.5 | 100000 | 74 | 2053 | 100000 | 100018 | −18 | 0 |

When the effective power of the wind turbine starts cutting in, the DC voltage is 48.8 volts, the basic electrodes mum reference current is 0.333 amp/cm$^2$ as shown in Table 4:

| Wind (m/s) | Vdc (V) | Idc (A) | Power (w) | quantity of basic electrodes in basic electrolyzer | size of electrode in basic electrolyzer (cm$^2$) | Available power for series electrodes (w) | Max allowable consumed power of series electrodes (w) |
|---|---|---|---|---|---|---|---|
| 4 | 48.8 | 152 | 7412 | 26 | 1519 | 7412 | 24684 |
| 4.5 | 54.9 | 192 | 10554 | 29 | 1519 | 10554 | 27770 |
| 5 | 61 | 237 | 14477 | 32 | 1519 | 14477 | 30855 |
| 5.5 | 67.1 | 287 | 19270 | 35 | 1519 | 19270 | 33941 |
| 6 | 73.2 | 342 | 25017 | 38 | 1519 | 25017 | 37027 |
| 6.5 | 79.2 | 401 | 31767 | 41 | 1519 | 31767 | 40061 |
| 7 | 85.3 | 465 | 39680 | 44 | 1519 | 39680 | 43147 |
| 7.5 | 91.4 | 534 | 48808 | 47 | 1519 | 48808 | 46233 |
| 8 | 97.5 | 608 | 59239 | 50 | 1519 | 59239 | 49318 |
| 8.5 | 104 | 686 | 71059 | 53 | 1519 | 71059 | 52404 |
| 9 | 110 | 769 | 84356 | 56 | 1519 | 84356 | 55489 |
| 9.5 | 116 | 857 | 99215 | 59 | 1519 | 99215 | 58575 |
| 10 | 122 | 949 | 115725 | 62 | 1519 | 115725 | 61660 |
| 10.5 | 128 | 1047 | 133971 | 65 | 1519 | 133971 | 64746 |
| 11 | 134 | 1149 | 154041 | 68 | 1519 | 154041 | 67831 |
| 11.5 | 140 | 1256 | 176022 | 71 | 1519 | 176022 | 70917 |
| 12 | 146 | 1367 | 200000 | 74 | 1519 | 200000 | 74002 |

| Wind (m/s) | Surplus power of series electrolyzers (w) | Parallel electrolyzer 1 allows power consumption (w) | Power consumed by parallel electrolyzer 1 (w) | Parallel electrolyzer 1 surplus power (w) | Parallel electrolyzer 2 allows power consumption (w) | Power consumed by parallel electrolyzer 2 (w) | Parallel electrolyzer 2 surplus power (w) |
|---|---|---|---|---|---|---|---|
| 4 | −17271 | | | | | | |
| 4.5 | −17216 | | | | | | |
| 5 | −16378 | | | | | | |
| 5.5 | −14671 | | | | | | |
| 6 | −12009 | | | | | | |
| 6.5 | −8295 | | | | | | |
| 7 | −3467 | | | | | | |
| 7.5 | 2576 | 46233 | 2576 | −43657 | | | |
| 8 | 9921 | 49318 | 9921 | −39397 | | | |
| 8.5 | 18656 | 52404 | 18656 | −33748 | | | |
| 9 | 28867 | 55489 | 28867 | −26623 | | | |
| 9.5 | 40641 | 58575 | 40641 | −17934 | | | |
| 10 | 54065 | 61660 | 54065 | −7596 | | | |
| 10.5 | 69225 | 64746 | 69225 | 4480 | 46233 | 4480 | −41753 |
| 11 | 86210 | 67831 | 86210 | 18379 | 49318 | 18379 | −30940 |
| 11.5 | 105105 | 70917 | 105105 | 34188 | 52404 | 34188 | −18216 |
| 12 | 125998 | 74002 | 125998 | 51995 | 58575 | 51995 | −6580 |

When the effective power of the wind turbine starts cutting in, the DC voltage is 48.8 volts, the basic electrodes are set with 26 series electrodes, the cut-in current is 151.85 amperes, the reference current is set at 0.1 amp/cm$^2$, the maximum reference current is set at 0.333 amp/cm$^2$, and the electrolyzer is set at 0.333 amp/cm$^2$. An electrolyzer with effective size of 151.85/0.1=1519 cm$^2$ and electrode with 1519 cm$^2$ does not need an additional electrolyzer when the wind speed is not over 7 m/s. In this embodiment, the size of the parallel electrolyzer is the same as that of the basic electrolyzer. One electrolyzer can be connected in parallel when the wind speed is lower than 10.5 m/s. When the wind speed reaches or exceeds 10.5 m/s, the second electrolyzer is required. However, if the parallel electrolytes are set at a current of 534 amp/cm$^2$ at a wind speed of 7.5 m/s, the size of the parallel electrolyzer is 534/0.1=5340 cm$^2$, and one electrolyzer in parallel can meet the needs of the fluctuating power supply.

Example 5

In Example 5, a doubly-fed 1.5 MW wind turbine is used as the power supply, and 0.055 amp is used as the reference current scheme. Example 5 uses an existing 1500-kilowatt doubly-fed wind turbine as the power source for the electrolyzer. The wind/power characteristics of this type of wind turbine are as follows. Since the doubly-fed wind turbine has the same voltage and frequency in most wind speed ranges, the power. The difference is only in the current as shown in Table 5-1 and results in Table 5-2:

TABLE 5-1

| Wind (m/s) | Vac | Vdc | Idc | Watt |
|---|---|---|---|---|
| 12 | 110.0 | 146.3 | 10253 | 1500000 |
| 11.5 | 110.0 | 146.3 | 9023 | 1320000 |
| 11 | 110.0 | 146.3 | 7897 | 1155300 |
| 10.5 | 110.0 | 146.3 | 6863 | 1004000 |
| 10 | 110.0 | 146.3 | 5926 | 867000 |
| 9.5 | 110.0 | 146.3 | 5079 | 743000 |
| 9 | 110.0 | 146.3 | 4327 | 633000 |
| 8.5 | 110.0 | 146.3 | 3643 | 533000 |
| 8 | 110.0 | 146.3 | 3042 | 445000 |
| 7.5 | 110.0 | 146.3 | 2502 | 366000 |

TABLE 5-1-continued

| Wind (m/s) | Vac | Vdc | Idc | Watt |
|---|---|---|---|---|
| 7 | 110.0 | 146.3 | 2030 | 297000 |
| 6.5 | 110.0 | 146.3 | 1627 | 238000 |
| 6 | 110.0 | 146.3 | 1278 | 187000 |
| 5.5 | 110.0 | 146.3 | 984 | 144000 |
| 5 | 110.0 | 146.3 | 738 | 108000 |
| 4.5 | 110.0 | 146.3 | 540 | 79000 |
| 4 | 110.0 | 146.3 | 376 | 55000 |

Under the rated power of 12 m/s, one basic electrolytic cell and one parallel electrolytic cell can meet the demand, and there is a surplus of nearly 80 kilowatts, so the size of the parallel electrolyzer can also be appropriately reduced to reduce equipment costs.

Example 6

In Example 6, a 500 kw with 144 volts solar power station is used as the power source, and 0.2 amp is used as the reference current scheme. Example 6 consists of 2000 groups of 250 watts with 24 volts solar panels, which are connected by 4 strings and 500 parallel connecting to form a 144 volt (145 volt)/500 kw solar power station. The reference current is set at 0.2 amp/cm$^2$ and the maximum reference current is set at 0.3 amp/cm$^2$.

TABLE 5-2

| Wind (m/s) | Vdc (V) | Idc (A) | Power (w) | quantity of series electrodes | size of electrode in basic electrolyzer (cm$^2$) | Power available for series electrodes (w) |
|---|---|---|---|---|---|---|
| 4 | 146.3 | 376 | 55000 | 74 | 6835 | 55000 |
| 4.5 | 146.3 | 540 | 79000 | 74 | 6835 | 79000 |
| 5 | 146.3 | 738 | 108000 | 74 | 6835 | 108000 |
| 5.5 | 146.3 | 984 | 144000 | 74 | 6835 | 144000 |
| 6 | 146.3 | 1278 | 187000 | 74 | 6835 | 187000 |
| 6.5 | 146.3 | 1627 | 238000 | 74 | 6835 | 238000 |
| 7 | 146.3 | 2030 | 297000 | 74 | 6835 | 297000 |
| 7.5 | 146.3 | 2502 | 366000 | 74 | 6835 | 366000 |
| 8 | 146.3 | 3042 | 445000 | 74 | 6835 | 445000 |
| 8.5 | 146.3 | 3643 | 533000 | 74 | 6835 | 533000 |
| 9 | 146.3 | 4327 | 633000 | 74 | 6835 | 633000 |
| 9.5 | 146.3 | 5079 | 743000 | 74 | 6835 | 743000 |
| 10 | 146.3 | 5926 | 867000 | 74 | 6835 | 867000 |
| 10.5 | 146.3 | 6863 | 1004000 | 74 | 6835 | 1004000 |
| 11 | 146.3 | 7897 | 1155300 | 74 | 6835 | 1155300 |
| 11.5 | 146.3 | 8887 | 1300204 | 74 | 6835 | 1300204 |
| 12 | 146.3 | 10253 | 1500000 | 74 | 6835 | 1500000 |

| Wind (m/s) | Max allowable power consumption of series electrodes (w) | electrolyzer surplus power (w) | size of parallel electrolyzer (cm$^2$) | Parallel electrolyzers allow power consumption (w) | Power consumption by parallel electrolyzer (w) | Parallel electrolyzer surplus power (w) |
|---|---|---|---|---|---|---|
| 4 | 300000 | −245000 | | | | |
| 4.5 | 299988 | −220988 | | | | |
| 5 | 299988 | −191988 | | | | |
| 5.5 | 299988 | −155988 | | | | |
| 6 | 299988 | −112988 | | | | |
| 6.5 | 299988 | −61988 | | | | |
| 7 | 299988 | −2988 | | | | |
| 7.5 | 299988 | 66012 | 45486 | 1996364 | 66012 | −1930352 |
| 8 | 299988 | 145012 | 45486 | 1996381 | 145012 | −1851369 |
| 8.5 | 299988 | 233012 | 45486 | 1996381 | 233012 | −1763369 |
| 9 | 299988 | 333012 | 45486 | 1996381 | 333012 | −1663369 |
| 9.5 | 299988 | 443012 | 45486 | 1996381 | 443012 | −1553369 |
| 10 | 299988 | 567012 | 45486 | 1996381 | 567012 | −1429369 |
| 10.5 | 299988 | 704012 | 45486 | 1996381 | 704012 | −1292369 |
| 11 | 299988 | 855312 | 45486 | 1996381 | 855312 | −1141069 |
| 11.5 | 299988 | 1000216 | 45486 | 1996381 | 1000216 | −996165 |
| 12 | 299988 | 1200012 | 45486 | 1996381 | 1200012 | −796369 |

In Example 5, the reference current is set at 0.055 amp/cm$^2$, the maximum reference current is set at 0.3 amp/cm$^2$, and the size of the basic electrolytic cell is 376/0.55=6835 cm$^2$. When the wind speed reaches 7.5 m/s, an electrolytic cell needs to be connected in parallel, and the size of the parallel electrolytic cell is 2502/0.55=45486 cm$^2$.

| Pdc | Vdc | I dc | quantity of series electrodes | size of basic electrolyzer (cm²) | available power for series electrodes (w) | Max allowable power consumption of series electrodes (w) | Series eectrode surplus power (w) | size of parallel eectrolyzer (cm²) | Usable power of parallel electrolyzers (w) | Max allowable power consumption of parallel electrolyzers (w) | Parallel electrolyzer surplus power (w) |
|---|---|---|---|---|---|---|---|---|---|---|---|
| 40000 | 40 | 1000 | 22 | 5000 | 40000 | 60000 | −20000 | | | | |
| 50625 | 45 | 1125 | 25 | 5000 | 50625 | 67500 | −16875 | | | | |
| 62500 | 50 | 1250 | 28 | 5000 | 62500 | 75000 | −12500 | | | | |
| 75625 | 55 | 1375 | 31 | 5000 | 75625 | 82500 | −6875 | | | | |
| 90000 | 60 | 1500 | 33 | 5000 | 90000 | 90000 | 0 | | | | |
| 105625 | 65 | 1625 | 36 | 5000 | 105625 | 97500 | 8125 | 8125 | 8125 | 158438 | −150313 |
| 122500 | 70 | 1750 | 39 | 5000 | 122500 | 105000 | 17500 | 8125 | 17500 | 170625 | −153125 |
| 140625 | 75 | 1875 | 42 | 5000 | 140625 | 112500 | 28125 | 8125 | 28125 | 182813 | −154688 |
| 160000 | 80 | 2000 | 44 | 5000 | 160000 | 120000 | 40000 | 8125 | 40000 | 195000 | −155000 |
| 180625 | 85 | 2125 | 47 | 5000 | 180625 | 127500 | 53125 | 8125 | 53125 | 207188 | −154063 |
| 202500 | 90 | 2250 | 50 | 5000 | 202500 | 135000 | 67500 | 8125 | 67500 | 219375 | −151875 |
| 225625 | 95 | 2375 | 53 | 5000 | 225625 | 142500 | 83125 | 8125 | 83125 | 231563 | −148438 |
| 250000 | 100 | 2500 | 56 | 5000 | 250000 | 150000 | 100000 | 8125 | 100000 | 243750 | −143750 |
| 275625 | 105 | 2625 | 58 | 5000 | 275625 | 157500 | 118125 | 8125 | 118125 | 255938 | −137813 |
| 302500 | 110 | 2750 | 61 | 5000 | 302500 | 165000 | 137500 | 8125 | 137500 | 268125 | −130625 |
| 330625 | 115 | 2875 | 64 | 5000 | 330625 | 172500 | 158125 | 8125 | 158125 | 280313 | −122188 |
| 360000 | 120 | 3000 | 67 | 5000 | 360000 | 180000 | 180000 | 8125 | 180000 | 292500 | −112500 |
| 387500 | 125 | 3100 | 69 | 5000 | 387500 | 187500 | 200000 | 8125 | 200000 | 304688 | −104688 |
| 419900 | 130 | 3230 | 72 | 5000 | 419900 | 195000 | 224900 | 8125 | 224900 | 316875 | −91975 |
| 452250 | 135 | 3350 | 75 | 5000 | 452250 | 202500 | 249750 | 8125 | 249750 | 329063 | −79313 |
| 485800 | 140 | 3470 | 78 | 5000 | 485800 | 210000 | 275800 | 8125 | 275800 | 341250 | −65450 |
| 500000 | 145 | 3448 | 81 | 5000 | 500000 | 217500 | 282500 | 8125 | 282500 | 353438 | −70938 |

Assuming the sunlight is not strong, the starting voltage is 40 volts. The current is 1000 amps, the effective size of the series electrolytic cell is 1000×10000/2000=5000 cm², when the voltage rises to 65 volts, an electrolytic cell needs to be connected in parallel, and the effective size of the electrolytic cell is 1625×10000/2000=8125 amp/cm². After connecting an electrolyzer in parallel, even when the sun turns to the strongest, the electrolyzer still has a surplus capacity of 70 kw, so the actual parallel electrolyzer can appropriately reduce the area to reduce the cost.

Example 7

In Example 7, a 500 kw with 144 volts solar power station is used as the power source, using 0.095 amps as a reference current scheme. Example 7 is a solar power station with the same composition as Example 6. In Example 7, the reference current is set to 0.095 amp/cm², and the maximum reference current is set to 0.3 amp/cm². In Example 7, since the reference current is reduced from 0.2 amp/cm² in Example 6 to 0.095 amp/cm² in Example 7, there is no need to connect an electrolyzer in parallel even when the sun is the strongest, but the basic electrolyzers size is determined by the implementation of the 5000 cm² from Example 6 are increased to 10526 cm² to Example 7. When the sunlight is not strong enough, the equipment utilization ratio of the electrolysis device is low.

| Pdc | Vdc | I dc | quantity of electrodes | size of basic electrolyzer (cm²) | Available power of series electrodes (w) | Max allowable power consumption of series electrodes (w) | Surplus power of series electrolyzers (w) |
|---|---|---|---|---|---|---|---|
| 40000 | 40 | 1000 | 22 | 10526 | 40000 | 138947 | −98947 |
| 50625 | 45 | 1125 | 25 | 10526 | 50625 | 156311 | −105686 |
| 62500 | 50 | 1250 | 28 | 10526 | 62500 | 173679 | −111179 |
| 75625 | 55 | 1375 | 31 | 10526 | 75625 | 191047 | −115422 |
| 90000 | 60 | 1500 | 33 | 10526 | 90000 | 208415 | −118415 |
| 105625 | 65 | 1625 | 36 | 10526 | 105625 | 225783 | −120158 |
| 122500 | 70 | 1750 | 39 | 10526 | 122500 | 243151 | −120651 |
| 140625 | 75 | 1875 | 42 | 10526 | 140625 | 260519 | −119894 |
| 160000 | 80 | 2000 | 44 | 10526 | 160000 | 277886 | −117886 |
| 180625 | 85 | 2125 | 47 | 10526 | 180625 | 295254 | −114629 |
| 202500 | 90 | 2250 | 50 | 10526 | 202500 | 312622 | −110122 |
| 225625 | 95 | 2375 | 53 | 10526 | 225625 | 329990 | −104365 |
| 250000 | 100 | 2500 | 56 | 10526 | 250000 | 347358 | −97358 |
| 275625 | 105 | 2625 | 58 | 10526 | 275625 | 364726 | −89101 |
| 302500 | 110 | 2750 | 61 | 10526 | 302500 | 382094 | −79594 |
| 330625 | 115 | 2875 | 64 | 10526 | 330625 | 399462 | −68837 |
| 360000 | 120 | 3000 | 67 | 10526 | 360000 | 416830 | −56830 |
| 387500 | 125 | 3100 | 69 | 10526 | 387500 | 434198 | −46698 |
| 419900 | 130 | 3230 | 72 | 10526 | 419900 | 451565 | −31665 |
| 452250 | 135 | 3350 | 75 | 10526 | 452250 | 468933 | −16683 |
| 485800 | 140 | 3470 | 78 | 10526 | 485800 | 486301 | −501 |
| 500000 | 144 | 3448 | 80 | 10526 | 500000 | 500196 | −196 |

Knowing through the description of above 7 examples, countless combinations can be generated by changing the parameters such as the reference current, the maximum reference current, the cut-in voltage, the ratio of the minimum cut-in current and the reference current etc. to form new and different types of electrolyzers combinations. However, no matter the basic electrolyzer or the parallel electrolyzer, they are composed of a series of identical basic electrodes plus controllable series electrodes. At the same time, it can be clearly understood from above 7 typical embodiments that the present invention is a fusion innovative invention under the condition of fully understanding the characteristics of wind energy, solar power and electrolysis with very large energy fluctuations, and should be granted a patent.

The invention discloses a structure and control method of an electrode and an electrolytic cell which independently utilize clean energy with a very large power fluctuation range as an electrolysis power source, can be used for hydrogen production, oxygen production, etc. Technically, the initial number of electrodes is determined by the minimum cut-in voltage value of fluctuating power sources, such as wind or solar power. When the voltage increases, more electrodes are added in to maintain each electrode to remain at a stable 2-volt level. Due to unstable power sources, the ratio of the minimum cut-in current and the reference current corresponding to the lowest cut-in voltage value determine the effective number of the electrodes. When the voltage and current of the fluctuating power supply increase within a certain range, more series electrodes are connected to the basic electrolyzer. When the power supply voltage and current continue to increase and exceed the carrying range of the electrolyzer, additional electrolyzers with the same number of electrodes in series are automatically connected into the electrolyzer in parallel. On the contrary, a number of series electrodes or even parallel electrolyzers could be cut out when the voltage and current of the power source drop, in order to achieve more efficient electrolysis that uses large power and current fluctuation power source.

The above descriptions are only some representative examples of the present invention, and all changes and combinations of electrodes and electrolytic cells made according to the patent application method of the present invention shall fall within the scope of the present invention.

I claim:

1. A device for electrolysis, comprising
   a power supply for supplying power to electrolysis, wherein the power supply is a fluctuating power supply, wherein the fluctuating power supply is characterized by a minimum cut-in voltage with a corresponding minimum cut-in current and a corresponding power,
   an electrolyzer system, wherein the electrolyzer system comprises a basic electrolyzer and a number of controllable parallel electrolyzers, the basic electrolyzer comprises a group of basic electrodes connected in series and a number of controllable series electrodes, each of the controllable parallel electrolyzers comprises the same number of the basic electrodes connected in series and the same number of the controllable series electrodes as the basic electrolyzer, and each of the electrodes is preset with a reference voltage and a corresponding base reference current and a maximum reference current,
   a controller, wherein the controller detects the voltage and current of the electrolyzer system and the fluctuating power supply, controls each of the controllable series electrodes being connected or cutting out in series, and controls each of the controllable parallel electrolyzers being connected or cutting out in parallel according to power fluctuation,
   wherein the number of the basic electrodes in the basic electrolyzer is set according to the minimum cut-in voltage of the fluctuating power supply and the reference voltage of the electrodes,
   a size of the basic electrolyzer is set according to a ratio of the minimum cut-in current of the fluctuating power supply Ii over the basic reference current of the basic electrodes and the controllable series electrodes Ib as Ii/Ib, and
   each of the controllable series electrodes is connected to or cut off from the basic electrolyzer by the controller in response to voltage change in the fluctuating power supply of the power source to maintain working voltage in the electrodes at about the same as the reference voltage, and
   each of the controllable parallel electrolyzers is connected in parallel to or cut off from the electrolyzer system by the controller when working current in the electrodes exceeds the maximum reference current.

2. The device according to claim 1, further comprising wherein the number of the basic electrodes in the basic electrolyzer is set as the next integer to the ratio of the minimum cut-in voltage value of the fluctuating power supply to the reference voltage of the basic electrodes and the controllable series electrodes or the next integer plus 1.

3. The device according to claim 1, wherein the reference voltage of each of the basic electrodes and the controllable series electrodes is set to be between 1 to 2 Volts in direct current.

4. The device according to claim 1, wherein the ratio of Ii/Ib is in a range of from 0.003 to 10.

5. The device according to claim 4, wherein the reference current Ib is in a range of from 0.01 to 0.35 amp/cm$^2$.

6. The device according to claim 1, wherein the number of the controllable parallel electrolyzers in the device is 0 to 5.

7. The device according to claim 1, wherein the number of the controllable series electrodes is connected or cut out in series according to a positive and negative voltage fluctuation of 20% or more, respectively of the fluctuating power supply.

8. The device according to claim 1,
   the controller comprises a negative terminal and a positive terminal, the negative terminal is a control terminal of the controller, and the positive terminal is a common terminal.

9. The device according to claim 1, wherein the maximum power of the fluctuating power supply is greater than 2 times of the minimum power, and the maximum current is greater than 3 times of the minimum cut-in current.

10. A method for supplying and maintaining power supply for electrolysis, comprising
    providing a power supply for supplying power to electrolysis, wherein the power supply is a fluctuating power supply with a power fluctuation in a range from a minimum power to a maximum power, and the maximum power is greater than 2 times of the minimum power, and in a range from a minimum cut-in current to a maximum current, and the maximum current is greater than 3 times of the minimum cut-in current,
    providing an electrolyzer system, wherein the electrolyzer system comprises a basic electrolyzer comprising a plurality of basic electrodes connected in series with each other and a plurality of controllable series electrodes, and a number of controllable parallel electrolyzers, wherein each of the parallel electrolyzers comprises the same number of basic electrodes connected in series with each other and the same number of the controllable series electrodes as the basic electrolyzer, providing a controller, wherein the controller detects the voltage and current of the electrolyzer system and the fluctuating power supply, controls each of the controllable series electrodes being connected or cutting out in series, and controls each of the controllable parallel electrolyzers being connected or cutting out in parallel according to power fluctuation, wherein the controller is configured to sets a number of the basic electrodes in the basic electrolyzer according to a minimum cut-in voltage value of the fluctuating power supply, sets a size of the basic electrolyzer and the controllable parallel electrolyzers according to a ratio of Ii/Ib, Ii is the minimum cut-in current corresponding to the minimum cut-in voltage of the fluctuating power supply, Ib is a reference current corresponding to the reference voltage, and the ratio Ii/Ib is in a range of from 0.003 to 10, and connect in or cut out the number of the controllable parallel electrolyzers in the device according to the power fluctuation, and connect in or cut out each of the controllable series electrodes from the basic electrolyzer in response to voltage change in the fluctuating power supply of the power source to maintain working voltage in the electrodes at about the same as the reference voltage.

11. The method according to claim 10, wherein a reference voltage of each of the basic electrodes and the controllable series electrodes is set to be between 1 to 2 volts in direct current.

12. The method according to claim 10, wherein the reference current Ib is in a range of from 0.01 to 0.35 amp/cm$^2$.

13. The method according to claim 10, wherein the number of the controllable parallel electrolyzers in the device is 0 to 5.

14. The method according to claim 10, further comprising connecting in the controllable series electrodes according to a positive voltage fluctuation of 20% or more, and cutting out the controllable series electrodes according to a negative voltage fluctuation of 20% or more.

15. The method according to claim 10, wherein the device further comprises a controller, wherein the controller detects voltage, current, and the fluctuating power, connects with and controls that controllable series electrodes being connected in cutting in or cutting out in series and the controllable parallel electrolyzers being connected in cutting in or cutting out in parallel, and the controller comprises a negative terminal and a positive terminal, the negative terminal is a control terminal of the controller, and the positive terminal is a common terminal.

\* \* \* \* \*

UNITED STATES PATENT AND TRADEMARK OFFICE
CERTIFICATE OF CORRECTION

| | | |
|---|---|---|
| PATENT NO. | : 12,460,307 B2 | Page 1 of 1 |
| APPLICATION NO. | : 17/959296 | |
| DATED | : November 4, 2025 | |
| INVENTOR(S) | : Qiang Yan | |

It is certified that error appears in the above-identified patent and that said Letters Patent is hereby corrected as shown below:

On the Title Page

Left column, Line 21, between the sections of "(63) Related U.S. Application Data" and "(51) Int. Cl.," insert the following foreign priority application:
-- (30) Foreign Application Priority Data
April 13, 2020 (CN) ......................................................................... 202010287807.3 --

Signed and Sealed this
Second Day of December, 2025

John A. Squires
*Director of the United States Patent and Trademark Office*